United States Patent
Yang et al.

(10) Patent No.: US 11,131,395 B2
(45) Date of Patent: Sep. 28, 2021

(54) DOUBLE-PLATE GATE VALVE AND USE OF THE SAME

(71) Applicants: BEIJING AEROSPACE PROPULSION INSTITUTE, Beijing (CN); BEIJING AEROSPACE PETROCHEMICAL TECHNOLOGY & EQUIPMENT ENGINEERING CORPORATION LIMITED, Beijing (CN)

(72) Inventors: Fan Yang, Beijing (CN); Jinxian Liu, Beijing (CN); Yingren Ding, Beijing (CN); Jin Guo, Beijing (CN); Xiang Su, Beijing (CN); Huan Yang, Beijing (CN); Jingbo Han, Beijing (CN); Pingyang Zheng, Beijing (CN)

(73) Assignees: BEIJING AEROSPACE PROPULSION INSTITUTE, Beijing (CN); BEIJING AEROSPACE PETROCHEMICAL TECHNOLOGY & EQUIPMENT ENGINEERING CORPORATION LIMITED, Beijing (CN)

( * ) Notice: Subject to any disclaimer, the term of this patent is extended or adjusted under 35 U.S.C. 154(b) by 0 days.

(21) Appl. No.: 16/753,040

(22) PCT Filed: Jan. 28, 2019

(86) PCT No.: PCT/CN2019/073315
§ 371 (c)(1),
(2) Date: Apr. 2, 2020

(87) PCT Pub. No.: WO2020/034599
PCT Pub. Date: Feb. 20, 2020

(65) Prior Publication Data
US 2020/0292086 A1    Sep. 17, 2020

(30) Foreign Application Priority Data

Aug. 16, 2018 (CN) .......................... 201810935158.6

(51) Int. Cl.
*F16K 3/18* (2006.01)
*F16K 3/314* (2006.01)

(52) U.S. Cl.
CPC .............. *F16K 3/186* (2013.01); *F16K 3/188* (2013.01); *F16K 3/314* (2013.01)

(58) Field of Classification Search
CPC .......... F16K 3/186; F16K 3/188; F16K 3/029; F16K 3/314; F16K 41/02
See application file for complete search history.

(56) References Cited

U.S. PATENT DOCUMENTS

| 834,878 | A | * | 11/1906 | Anderson | ............... F16K 3/186 251/167 |
| 1,250,041 | A | * | 12/1917 | Snyder | ................... F16K 3/186 251/187 |

(Continued)

FOREIGN PATENT DOCUMENTS

| CN | 2934798 | 8/2007 |
| CN | 201145054 | 11/2008 |

(Continued)

OTHER PUBLICATIONS

International Search Report for PCT/CN2019/073315 dated Mar. 13, 2019, 10 pages.

(Continued)

*Primary Examiner* — David Colon-Morales
(74) *Attorney, Agent, or Firm* — Dority & Manning, P.A.

(57) ABSTRACT

A double-plate gate valve includes a valve body, a valve cover, a valve stem, a guide plate, a goggle plate assembly, a diversion hole assembly, a disc spring assembly and a valve plate and wedge assembly. The goggle plate assembly (Continued)

provides mounting support for the diversion hole assembly and the valve plate and wedge assembly in the valve chamber, the goggle plate assembly is movable along with the diversion hole assembly and the valve plate and wedge assembly in the valve chamber, and floating seals are formed at a contact surface between the diversion hole assembly and the guide plate, and at a contact surface between the valve plate and wedge assembly and the guide plate. A face-to-face distance and a sealing force between a sealing surface of the diversion hole assembly and a sealing surface of the valve body are adjustable.

10 Claims, 7 Drawing Sheets

(56) References Cited

U.S. PATENT DOCUMENTS

| | | | | |
|---|---|---|---|---|
| 1,869,741 | A * | 8/1932 | Du Bois | F16K 3/186 251/176 |
| 2,306,490 | A * | 12/1942 | Wiley | F16K 3/186 251/176 |
| 2,705,610 | A * | 4/1955 | Hjulian | F16K 3/316 251/175 |
| 2,747,833 | A * | 5/1956 | Langner | F16K 3/186 251/196 |
| 2,826,391 | A | 3/1958 | Bredtschneider et al. | |
| 2,861,770 | A * | 11/1958 | Bredtschneider | F16K 3/186 251/167 |
| 4,134,571 | A * | 1/1979 | Wheatley | F16K 3/186 251/167 |
| 5,024,453 | A * | 6/1991 | Suggs | E21B 33/08 277/523 |
| 5,116,022 | A * | 5/1992 | Genreith | F16K 3/184 251/175 |
| 5,236,345 | A * | 8/1993 | Nevrekar | F16K 3/14 251/193 |
| 5,413,140 | A | 5/1995 | Kimpel et al. | |
| 7,600,528 | B2 * | 10/2009 | Brzoska | F16K 3/20 137/241 |
| 7,666,280 | B2 * | 2/2010 | Kersternich | C10B 1/04 202/241 |
| 7,931,251 | B2 * | 4/2011 | Partridge | F16K 3/186 251/167 |
| 8,413,956 | B2 * | 4/2013 | Zingsem | F16K 3/186 251/197 |
| 10,167,976 | B2 * | 1/2019 | Nitta | F16K 41/02 |
| 2001/0032952 | A1 * | 10/2001 | Lah | F16J 15/187 251/214 |
| 2014/0097373 | A1 * | 4/2014 | Linser | F16K 41/02 251/355 |
| 2018/0306332 | A1 * | 10/2018 | Gandelheidt | F16K 3/0254 |
| 2019/0331234 | A1 * | 10/2019 | Klein | C10B 25/08 |

FOREIGN PATENT DOCUMENTS

| | | | |
|---|---|---|---|
| CN | 201269316 | 7/2009 | |
| CN | 101672374 | 3/2010 | |
| CN | 101725722 | 6/2010 | |
| CN | 101929556 | 12/2010 | |
| CN | 204533613 | 8/2015 | |
| CN | 205207733 | 5/2016 | |
| CN | 207715787 | 8/2018 | |
| CN | 108757973 | 11/2018 | |
| CN | 208858972 | 5/2019 | |
| DE | 19723962 A1 * | 12/1998 | ............ F16K 3/186 |
| DE | 202016102555 U1 * | 6/2016 | ............ C10B 5/00 |
| DE | 202016102559 | 6/2016 | |
| FR | 1213840 | 4/1960 | |

OTHER PUBLICATIONS

European Search Report for PCT/CN2019/073315 dated Apr. 12, 2021, 10 pages.

* cited by examiner

Figure 1

Prior Art

DOUBLE-PLATE GATE VALVE AND USE OF THE SAME

CROSS REFERENCE TO RELATED APPLICATIONS

The present application is the national phase of International Application No. PCT/CN2019/073315, titled "DOUBLE-PLATE GATE VALVE", filed on Jan. 28, 2019, which claims the priority to Chinese Patent Application No. 201810935158.6, titled "DOUBLE-PLATE GATE VALVE", filed with the China National Intellectual Property Administration on Aug. 16, 2018, the entire disclosures thereof are incorporated herein by reference.

FIELD

The present application relates to the technical field of catalytic cracking equipment for ethylene, and in particular to a double-plate gate valve.

BACKGROUND

A double-plate gate valve is a parallel type gate valve. Two valve plates are mounted in a goggle-type goggle plate assembly. When the valve is closed, the two valve plates are pushed apart to be pressed tightly on a valve seat by wedges, to form a forced seal. During the opening and closing processes of the valve, the valve plates are always in close contact with guide plates, and the valve plates move in the guide plates without clearance, to form a floating seal to prevent the medium from entering the valve chamber during the opening and closing processes. When the valve is fully opened, the valve is equivalent to a straight through pipe, and an elastic seal is formed between the diversion hole assembly and the valve seat, to preventing the medium from entering the valve chamber. The action of this type of valve is divided into two steps, when closing the valve, the valve plates are moved to position and then pushed apart to form the seal, and when opening the valve, the valve plates are withdrawn and then moved upward.

The conventional double-plate gate valve has the following defects and disadvantages.

1) When the valve is at an opened position, the seal is not ideal. When the valve is at the open position, the conventional diversion hole cannot provide sufficient sealing force to realize the seal, which allows the medium to enter the valve chamber, and thereby affecting the action of the valve.

2) An energy storage disc spring is fragile and cannot be replaced online. The conventional disc spring is mounted in the valve chamber and may be seriously damaged due to the high temperature, once the disc spring is damaged, the energy storage capacity of the disc spring will be lost, which affects the action of the valve. However, since the disc spring is mounted in the valve chamber, the state of the disc spring cannot be observed, and the damaged disc spring cannot be replaced online.

3) When the valve is at the closed position, because the valve employs an upper-wedge structure, and the two valve plates and the wedges are movable components, in a case that the valve plate at one side cannot realize the seal, the seal performance of the valve plate at the other side will be adversely affected.

SUMMARY

An object of the present application is to provide a double-plate gate valve, to overcome the disadvantages of the conventional technology, so as to solve the seal problem at an opened position in the conventional technology.

The technical solution of the present application is as follows. A double-plate gate valve includes a valve body, a valve cover, a valve stem, a guide plate, a goggle plate assembly, a diversion hole assembly, a disc spring assembly and a valve plate and wedge assembly. The guide plate is nested in a valve chamber formed by the valve body and the valve cover. The goggle plate assembly provides mounting support for the diversion hole assembly and the valve plate and wedge assembly in the valve chamber, the goggle plate assembly is able to move along with the diversion hole assembly and the valve plate and wedge assembly in the valve chamber, and floating seals are formed at a contact surface between the diversion hole assembly and the guide plate, and at a contact surface between the valve plate and wedge assembly and the guide plate. The diversion hole assembly is adjustable, that is, a face-to-face distance and a sealing force between a sealing surface of the diversion hole assembly and a sealing surface of the valve body are adjustable, to allow a straight through pipe to be formed and an elastic seal between the diversion hole assembly and a valve seat to be formed in a case that the valve is fully opened. The disc spring assembly is configured to overcome friction forces of the valve plate and wedge assembly and the diversion hole assembly during a closing process of the valve. The valve stem is configured to transmit actuating forces during opening and closing processes of the valve.

Preferably, the diversion hole assembly includes an adjustable diversion hole structure, adjusting bolts, disc springs A, disc spring gaskets, force-adjustment nuts, locking nuts, distance-adjustment nuts, packing A, and a lower-flange packing gland;

the adjustable diversion hole structure includes an upper flange, a lower flange and a circular guide tube;

the upper flange is fixedly connected with the circular guide tube, slots are uniformly provided at a side edge of the upper flange, and each of the adjusting bolts is mounted in a corresponding slot;

a disc spring A, a disc spring gasket, a force-adjustment nut, a locking nut and a distance-adjustment nut are sequentially mounted on the adjusting bolt; the disc spring A is in contact with a lower surface of the slot and is pressed against the lower surface of the slot by the disc spring gasket and the force-adjustment nut;

the packing A is filled between the lower flange and the circular guide tube, and the packing A is pressed by the lower-flange packing gland, to ensure a seal between the lower flange and the circular guide tube;

the distance-adjustment nut is in contact with the lower-flange packing gland; and the lower flange is fixedly connected with the lower-flange packing gland.

Preferably, the slots are T-shaped.

Preferably, the sealing force is adjusted by adjusting a compression amount of the disc spring through the force-adjustment nut.

Preferably, the disc spring assembly is located outside the valve chamber.

Preferably, the disc spring assembly includes a secondary valve stem, a disc spring, packing B filled between the secondary valve stem and the valve stem, a secondary-valve-stem packing gland, anti-rotation studs, a disc spring pressing plate, tooling nuts, and an expansion connection sleeve assembly;

the packing B is pressed by the secondary-valve-stem packing gland, the secondary-valve-stem packing gland is fixedly connected with one end of the secondary valve stem, and another end of the secondary valve stem is in contact with the goggle plate assembly; the disc spring is sleeved on the valve stem and pressed against the secondary-valve-stem packing gland by the disc spring pressing plate; the compression amount of the disc spring is adjusted by the expansion connection sleeve assembly, and the expansion connection sleeve assembly is fixed on the valve stem and is in contact with the disc spring pressing plate.

Preferably, the compression amount of the disc spring is determined according to a maximum friction force during operation of the valve.

Preferably, the valve plate and wedge assembly includes two valve plates, a valve stem column cap, two wedges and a support wedge;

the support wedge is fixed to the goggle plate assembly, and a central axis of the support wedge coincides with a central axis of the valve chamber; the valve stem column cap is mounted at one end of the valve stem for mounting the two wedges, a contact surface between each of the wedges and the valve stem is plane, and a contact surface between the wedge and the support wedge is oblique; and the two valve plates are mounted in the goggle plate assembly, and each of the two valve plates is able to move toward a flow channel according to a relative position of the corresponding wedge with respect to the support wedge.

Preferably, the support wedge is mounted at the goggle plate assembly through a pin washer, a pin, and a split pin.

Preferably, a bracket assembly is mounted on the valve cover outside the valve chamber, and an actuator is mounted via the bracket assembly, to drive the valve stem to move.

Preferably, the valve body is welded to the valve seat, and the guide plate is mounted on the valve seat.

Use of the double-plate gate valve in an ethylene production process is also provided.

The following are beneficial effects of the present application compared with the conventional technology.

(1) With the adjustable diversion hole structure, the face-to-face distance between sealing surfaces is adjustable, magnitude of the sealing force is adjustable, and the processing and maintenance of the valve are convenient.

1) The sealing force of the adjustable diversion hole structure is adjustable under the premise that the face-to-face distance L is constant.

As for a conventional bellows diversion hole structure, the sealing force cannot be adjusted under the premise that the face-to-face distance is constant; besides, after the valve is operated for a period of time, the face-to-face distance of the diversion hole structure is reduced due to the wear of the sealing surfaces, such that it is difficult to ensure the sealing performance of the valve. According to the present application, the sealing force required for the seal of the valve is provided by adjusting the force-adjustment nuts, which ensures the sealing performance without changing the face-to-face distance of the diversion hole structure, so that the adjustment of the sealing force is more flexible and reliable.

2) The face-to-face distance of the adjustable diversion hole structure is adjustable under the premise that the sealing force is constant.

As for the conventional bellows diversion hole structure, the face-to-face distance cannot be adjusted due to its structural limitation. With the wear of the sealing surfaces, the face-to-face distance of the diversion hole structure will be smaller and smaller, and finally leading to the failure of sealing. According to the present application, the face-to-face distance is adjusted by adjusting the distance-adjustment nuts. When the face-to-face distance is too large or too small, it is only required to adjust the distance-adjustment nuts, so as to adjust the face-to-face distance to a suitable distance, which does not affect the supply of the sealing force and realizes the separate adjustment of the face-to-face distance and the sealing force, and the separate adjustment is more reliable and convenient.

3) Long service life and low maintenance cost.

As for the conventional bellows diversion hole structure, the face-to-face distance of the sealing surface is gradually reduced due to wear, flushing and other reasons, thereby causing the failure of sealing. Due to the structural limitation, the face-to-face distance is not adjustable, and the valve can only be scrapped. According to the present application, the reduced face-to-face distance can be adjusted by adjusting the distance-adjustment nuts without affecting the performance, which prolongs the service life and reduces the maintenance cost.

4) Easy installation and maintenance.

As for the conventional bellows diversion hole structure, during the machining process, it is difficult to weld the bellows to the upper and lower flanges due to the small thickness of the bellows, and the processing accuracy cannot be guaranteed; and since the structure is formed by welding, the rigidity of the bellows is affected by the welding, which will affect the magnitude of the sealing force, and the sealing force may be provided unevenly. According to the present application, the bellows is not employed, which eliminates the influence of the welding, instead, the sealing force and the face-to-face distance are adjusted separately; besides, the valve has an assembly structure and uniform arrangement, which ensures that the sealing force is uniformly provided, ensures the processing accuracy, and also makes the future maintenance more convenient.

(2) The lower-wedge structure ensures that a reliable two-way seal is realized when the valve is at the closed position, and after the valve plate is changed to a flat plate structure, automatic adjustment in an axial direction can be realized, to ensure the seal.

1) Two-way seal at the closed position.

As for the conventional parallel double-plate gate valve, when the valve is at the closed position, the two valve plates are pressed by the wedge between the two valve plates; in a case that the valve plate at one side deviates or if leakage occurs when the valve plate is tightly fitted against the valve seat for realizing the seal, the wedge will be adjusted accordingly, and because the valve plate at another side is also connected to the wedge, the adjustment of the wedge will affect the sealing performance of the valve seat and the valve plate at the other side. According to the present application, a support wedge is additionally provided to separate the two wedges, so that independent sealing pairs are formed between the valve seat and the valve plates at both sides respectively, which are not affected by each other, that is, if the sealing at one side fails, the sealing at the other side is not affected, and thereby the two-way seal of the valve at the closed position is truly realized.

2) Self-adapting adjustment of the valve plates.

In the conventional valve plate structure, an oblique surface is provided to cooperate with the wedge, and the free rotation of the valve plate with respect to the axis thereof is limited due to the oblique surface. According to the present application, the oblique surface is not employed, and the wedge is in contact with a plane surface, to ensure the free rotation of the valve plate with respect to the axis, thereby realizing the function of automatic adjustment of the sealing.

(3) The external disc spring assembly can realize the online replacement of the disc spring, and the operating temperature of the disc spring is changed from high temperature to normal temperature, which improves the operating condition of the disc spring, and thereby prolonging the service life of the disc spring.

1) The working condition is improved.

As for the conventional parallel double-plate gate valve, the valve works at high temperature, and since the disc spring is located in the valve chamber, the disc spring also works at high temperature. According to the present application, the disc spring is located outside the valve chamber and works at normal temperature, which is helpful in prolonging the service life of the disc spring.

2) The state of the disc spring can be observed at any time.

As for the conventional parallel double-plate gate valve, since the disc spring is located in the valve chamber, the working state of the disc spring cannot be determined, which affects the safe operation of the valve. According to the present application, the disc spring is located outside the valve chamber, and the state of the disc spring can be observed at any time.

3) The broken disc spring can be replaced online.

As for the conventional parallel double-plate gate valve, since the disc spring is located in the valve chamber, the disc spring cannot be replaced online. According to the present application, the disc spring is located outside the valve chamber, so that the disc spring can be replaced online once the disc spring is found damaged, which simplifies the maintenance process and saves the maintenance time and cost.

The present application can effectively solve the problems of the conventional parallel double-plate gate valve, such as poor sealing performance, easy damage of the disc spring, and adverse affection of the opposite side on the sealing at the closed position and the like. The present application is more suitable for the current ethylene production process.

Reference numerals in FIGS. 1 to 16:

| 101 | valve body, | 102 | guide plate, |
|---|---|---|---|
| 103 | goggle plate assembly, | 104 | valve seat, |
| 106 | valve plate, | 107 | wedge, |
| 108 | support wedge, | 109 | pin washer, |
| 110 | pin, | 111 | split pin, |
| 112 | valve stem column cap, | 113 | packing C, |
| 114 | first packing sleeve, | 115 | valve stem, |
| 116 | sealing gasket, | 117 | second packing gland, |
| 118 | packing gland stud, | 119 | packing gland nut, |
| 120 | valve cover nut, | 121 | valve cover bolt, |
| 122 | bracket assembly bolt, | 123 | bracket assembly nut, |
| 124 | position-limiting bolt; | | |
| 200 | valve cover, | 201 | secondary valve stem, |
| 202 | packing B, | | |
| 203 | secondary-valve-stem packing gland, | 205 | disc spring B, |
| 207 | secondary-valve-stem packing-gland screw, | | |
| 240 | external disc spring assembly; | | |
| 300 | adjustable diversion hole structure, | 301 | upper flange, |
| 302 | lower flange, | 303 | lower-flange packing gland, |
| 304 | adjusting bolt, | 305 | disc spring gasket, |
| 306 | packing A, | 307 | disc spring A, |
| 308 | force-adjustment nut, | 309 | lower flange stud, |
| 310 | locking nut, | 311 | lower flange nut, |
| 312 | circular guide tube, | 313 | distance-adjustment nut; |
| 400 | expansion connection sleeve assembly; | | |
| 500 | bracket assembly. | | |

DETAILED DESCRIPTION OF EMBODIMENTS

The present application is described in detail hereinafter with reference to the drawings and embodiments.

A double-plate gate valve includes a valve body, a valve cover, a valve stem, a guide plate, a goggle plate assembly, a diversion hole assembly, a disc spring assembly and a valve plate and wedge assembly. The guide plate is nested in a valve chamber formed by the valve body and the valve cover. The goggle plate assembly provides mounting support for the diversion hole assembly and the valve plate and wedge assembly in the valve chamber, the goggle plate assembly is able to move along with the diversion hole assembly and the valve plate and wedge assembly in the valve chamber, and floating seals are formed at a contact surface between the diversion hole assembly and the guide plate, and at a contact surface between the valve plate and wedge assembly and the guide plate. The diversion hole assembly is adjustable, that is, a face-to-face distance and a sealing force between a sealing surface of the diversion hole assembly and a sealing surface of the valve body are adjustable, to allow a straight through pipe to be formed and an elastic seal between the diversion hole assembly and a valve seat to be formed in a case that the valve is fully opened. The disc spring assembly is configured to overcome friction forces of the valve plate and wedge assembly and the diversion hole assembly during a closing process of the valve. The valve stem is configured to transmit actuating forces during opening and closing processes of the valve.

Figure 4:
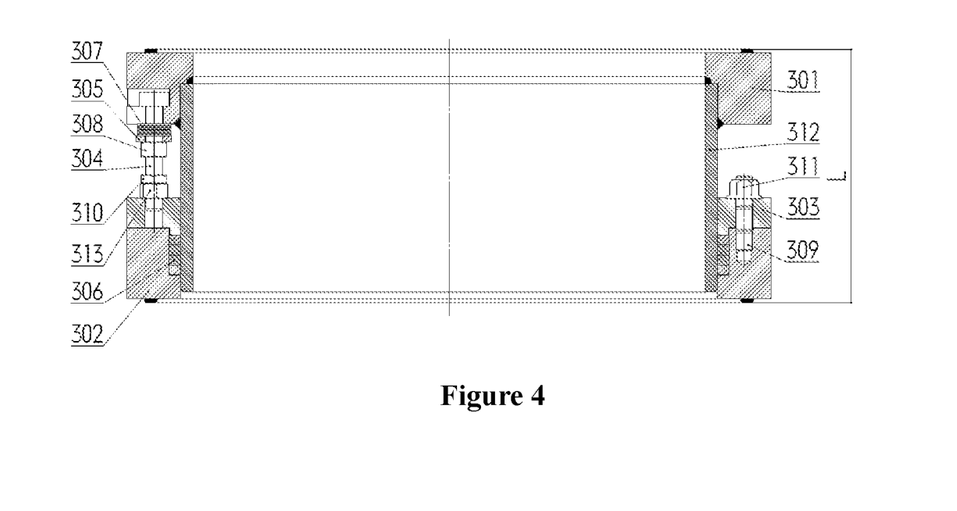
FIG. 4 is a revolved sectional view of the adjustable diversion hole according to the present application.

As shown in FIG. 4, the diversion hole assembly according to an embodiment includes an adjustable diversion hole structure, adjusting bolts, disc springs A, disc spring gaskets, force-adjustment nuts, locking nuts, distance-adjustment nuts, packing A, and a lower-flange packing gland.

The adjustable diversion hole structure includes an upper flange, a lower flange and a circular guide tube. The upper flange is fixedly connected with the circular guide tube, slots are uniformly provided at a side edge of the upper flange, and each of the adjusting bolts is mounted in a corresponding slot. A disc spring A, a disc spring gasket, a force-adjustment nut, a locking nut and a distance-adjustment nut are sequentially mounted on the adjusting bolt. The disc spring A is in contact with a lower surface of the slot, and is pressed against the lower surface of the slot by the disc spring gasket and the force-adjustment nut. The packing A is filled between the lower flange and the circular guide tube, and the packing A is pressed by the lower-flange packing gland, to ensure a seal between the lower flange and the circular guide tube. The distance-adjustment nut is in contact with the lower-flange packing gland, and the lower flange is fixedly connected with the lower-flange packing gland.

Figure 5:
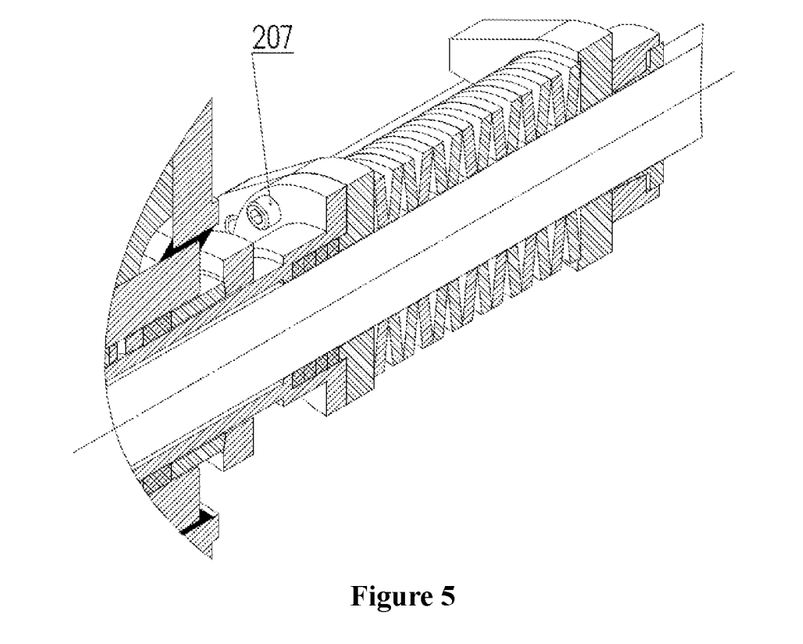
FIG. 5 is a perspective view showing an external disc spring assembly according to the present application.
Figure 6:
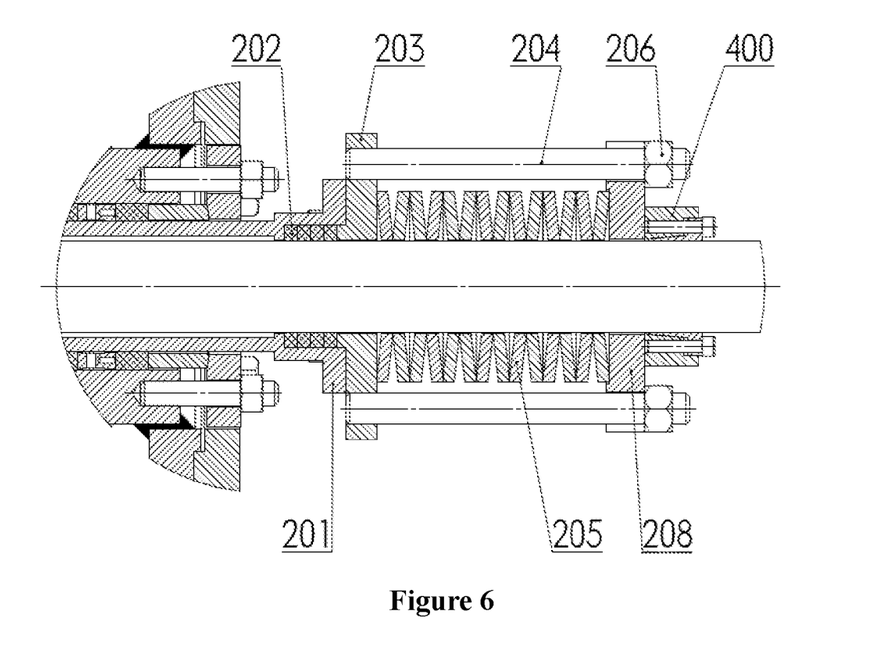
FIG. 6 is a sectional view of the external disc spring assembly according to the present application.

The disc spring assembly is located outside the valve chamber, and the disc spring assembly includes a secondary valve stem, a disc spring, packing B filled between the secondary valve stem and the valve stem, a secondary-valve-stem packing gland, anti-rotation studs 204, a disc spring pressing plate, tooling nuts 206, and an expansion connection sleeve assembly.

The packing B is pressed by the secondary-valve-stem packing gland, the secondary-valve-stem packing gland is fixedly connected with one end of the secondary valve stem, and another end of the secondary valve stem is in contact with the goggle plate assembly. The disc spring is sleeved on the valve stem and pressed against the secondary-valve-stem packing gland by the disc spring pressing plate. A compression amount of the disc spring is adjusted by the expansion connection sleeve assembly, and the expansion connection sleeve assembly is fixed on the valve stem and is in contact with the disc spring pressing plate.

Figure 9:
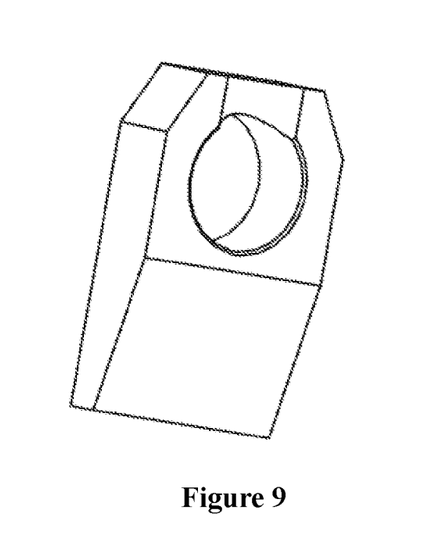
FIG. 9 is a perspective view showing the structure of a wedge according to the present application.
Figure 10:
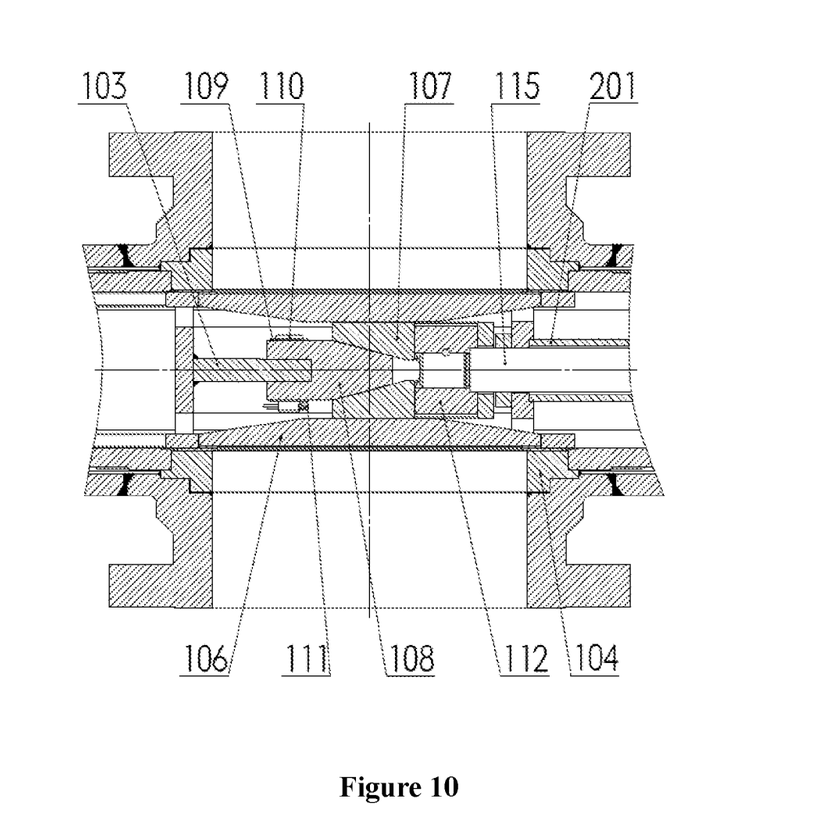
FIG. 10 is a sectional view of a downward pushing wedge structure according to the present application (a partial view of FIG. 2)

The valve plate and wedge assembly includes two valve plates, a valve stem column cap, two wedges and a support wedge. The support wedge is fixed to the goggle plate assembly, and a central axis of the support wedge coincides with a central axis of the valve chamber. The valve stem column cap is mounted at one end of the valve stem for mounting the two wedges, a contact surface between each of the wedges and the valve stem is plane, and a contact surface between the wedge and the support wedge is oblique. The two valve plates are mounted in the goggle plate assembly, and each of the two valve plates is able to move toward a flow channel according to a relative position of the corresponding wedge with respect to the support wedge.

A specific embodiment of the present application is described hereinafter, as shown in FIGS. 2 to 16, including the following components.

Figure 2:
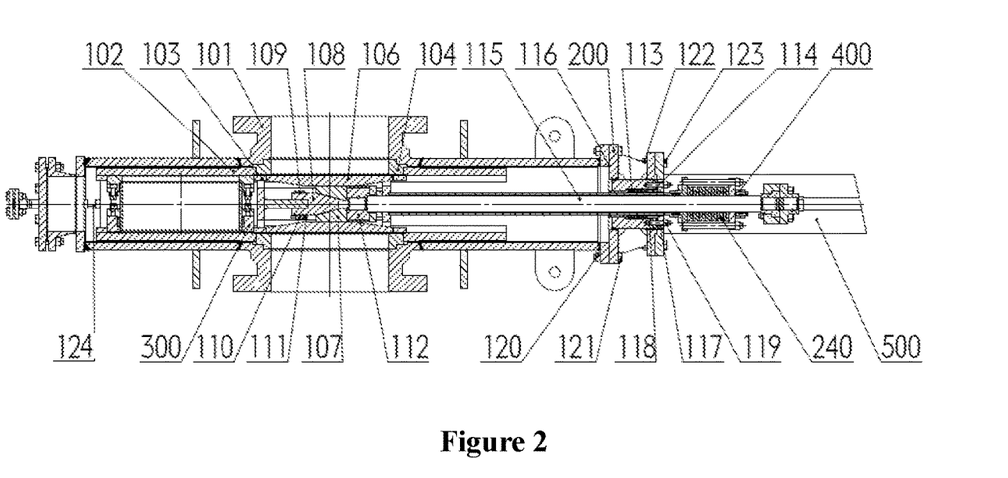
FIG. 2 is a schematic view showing a parallel double-plate gate valve according to the present application.

1) A valve body 101, a valve cover 200, a valve cover nut 120, and a valve cover bolt 121.

A sealing gasket 116 is provided between the valve body 101 and the valve cover 200 for sealing, and the valve body 101 is connected with the valve cover 200 by the valve cover nut 120 and the valve cover bolt 121.

2) A downward pushing wedge structure is provided as follows for improving a two-way seal when the valve is at a closed position. The downward pushing wedge structure includes a bracket assembly 500, a valve stem 115, a valve stem column cap 112, wedges 107, a support wedge 108, a pin washer 109, a pin 110, a split pin 111, valve plates 106, a bracket assembly nut 122, and a bracket assembly bolt 123.

The bracket assembly 500 is connected with the valve cover 200 by the bracket assembly nut 123 and the bracket assembly bolt 122; two wedges 107 are mounted on the valve stem column cap 112; the support wedge 108 is mounted to the goggle plate assembly 103 by the pin washer 109, the pin 110 and the split pin 111; the expansion connection sleeve assembly 400 is arranged on the valve stem 115, and the expansion connection sleeve assembly 400 moves along with the valve stem 115.

Figure 13:
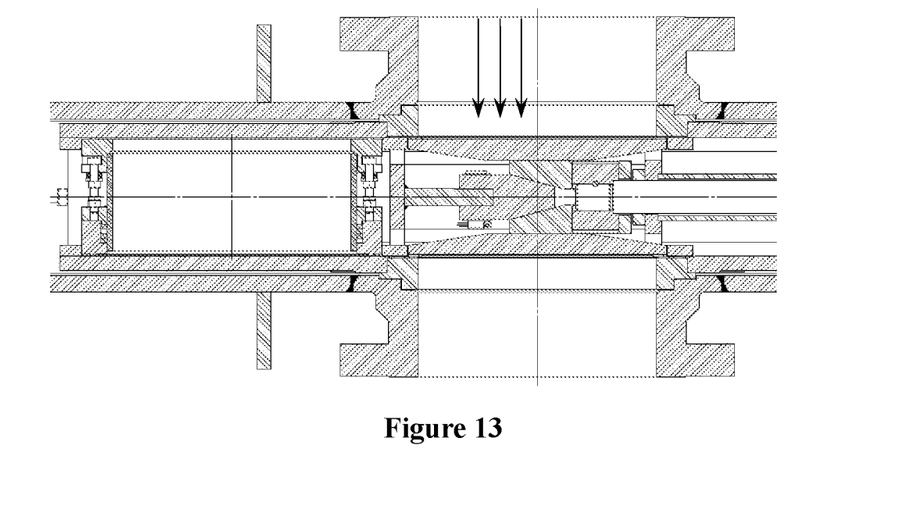
FIG. 13 is a schematic view showing the valve at a closed position (a partial view of FIG. 2)

In a case that the valve is in the closed position, the support wedge 108 is in a position-limiting state, the valve stem 115 drives the wedges 107 to move downward to press the support wedge 108 and the valve plates 106, so that the valve plates 106 are tightly fitted against the valve seat to ensure sealing. In a case that a valve plate 106 at one side is not strictly sealed, because of the support wedge 108, the seal at another side will not be affected, thereby ensuring the two-way seal.

Figure 7:
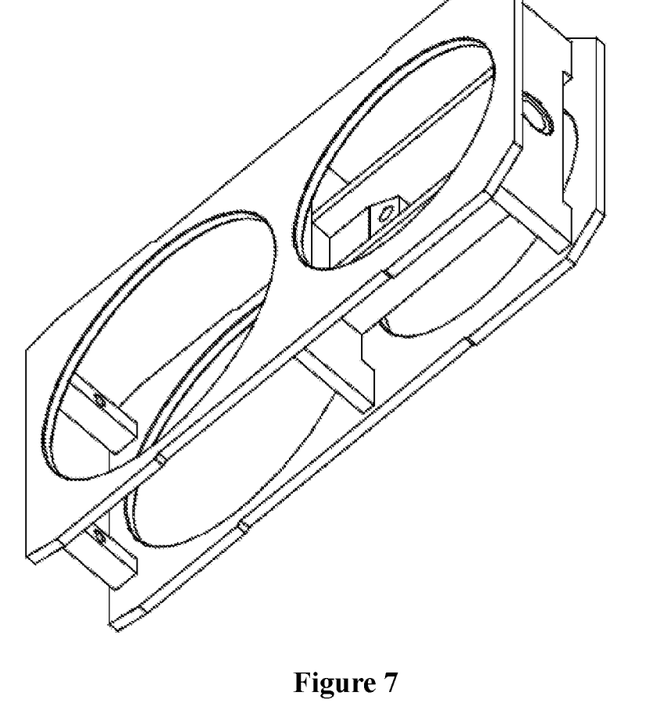
FIG. 7 is a perspective view showing a goggle plate assembly according to the present application.
Figure 8:
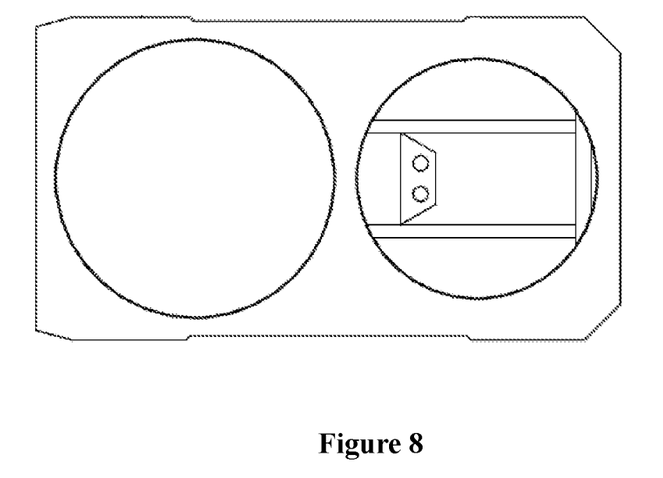
FIG. 8 is a front view of the goggle plate assembly according to the present application.

3) A goggle plate assembly 103, a valve seat 104, a guide plate 102, and a stud 122.

The valve stem 115 is inserted into the goggle plate assembly 103 to be connected with the valve stem column cap 112, and the valve plates 106 are mounted in the goggle plate assembly 103; the valve seat 104 is welded to the valve body 101, and the guide plate 102 is mounted on the valve seat 104; and the position-limiting bolt 124 is mounted at a lower portion of the goggle plate assembly.

An actuator is mounted on the bracket assembly 500, to drive the valve stem 115 to move.

An inner side of each of the wedges 107 is in contact with the support wedge 108, and an outer side of the wedge 107 is in contact with the corresponding valve plate 106.

Figure 1:
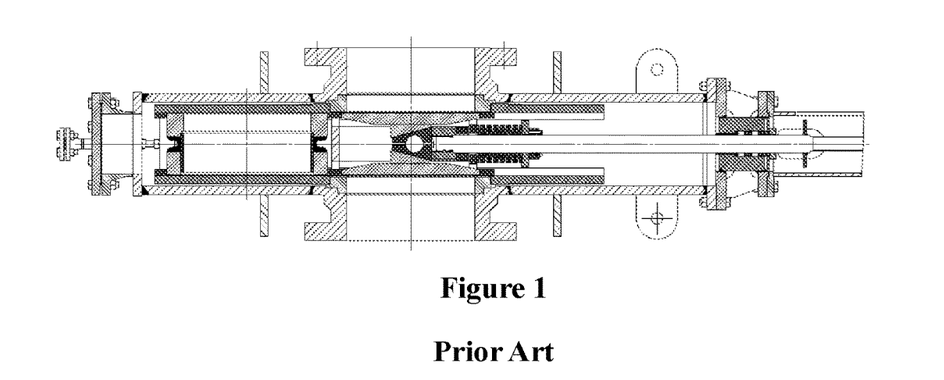
FIG. 1 is a schematic view of a conventional parallel double-plate gate valve.

As shown in FIG. 1, as for a conventional parallel double-plate gate valve, when the valve is at the closed position, the two valve plates are pressed by the wedge between the two valve plates; in a case that the valve plate at one side deviates or if leakage occurs when the valve plate is tightly fitted against the valve seat for realizing the seal, the wedge will be adjusted accordingly, and because the valve plate at another side is also connected to the wedge, the adjustment of the wedge will affect the sealing performance of the valve seat and the valve plate. According to the present application, the support wedge 108 is additionally provided to separate the two wedges 107, so that independent sealing pairs are formed between the valve seat and the valve plates at both sides respectively, which are not affected by each other, that is, if the sealing at one side fails, the sealing at the other side is not affected, and thereby the two-way seal of the valve at the closed position is truly realized.

In addition, in the conventional valve plate structure, an oblique surface is provided to cooperate with the wedge, and free rotation of the valve plate with respect to an axis thereof is limited due to the oblique surface. According to the present application, the oblique surface is not employed, and the wedge is in contact with a plane surface, to ensure the free rotation of the valve plate with respect to the axis, thereby realizing a function of automatic adjustment of the sealing.

Figure 3:
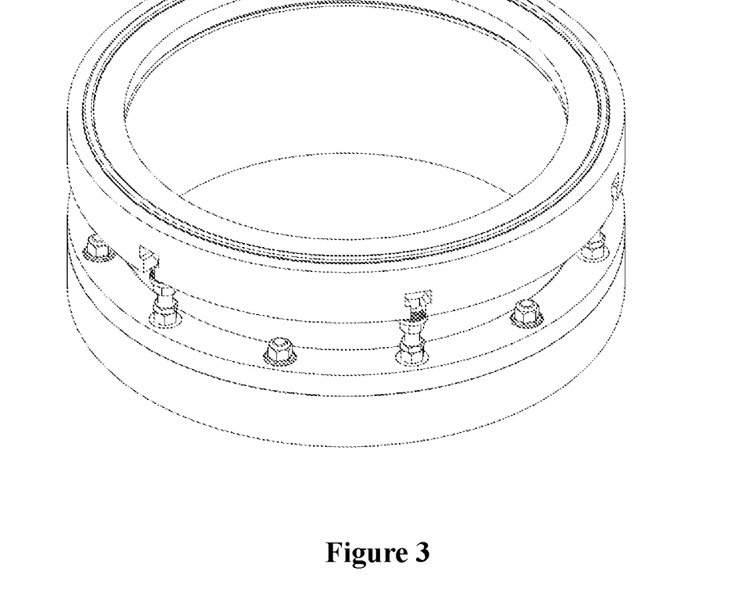
FIG. 3 is a perspective view showing an adjustable diversion hole according to the present application.

4) An adjustable diversion hole structure 300, adjusting bolts 304, disc springs A 307, disc spring gaskets 305, force-adjustment nuts 308, locking nuts 310, distance-adjustment nuts 313, packing A 306, a lower-flange packing gland 303, lower flange studs 309, and lower flange nuts 311.

The adjustable diversion hole structure 300 is mounted in a lower chamber of the goggle plate assembly 103; and the adjustable diversion hole structure includes an upper flange 301, a lower flange 302, and a circular guide tube 312. The upper flange 301 is welded to the circular guide tube 312, slots are uniformly provided at a side edge of the upper flange 301, and each of the adjusting bolts is mounted in a corresponding slot. A disc spring A 307, a disc spring gasket 305, a force-adjustment nut 308, a locking nut 310 and a distance-adjustment nut 313 are sequentially mounted on the adjusting bolt 304, and are pressed by the disc spring gasket 305 and the force-adjustment nut 308.

The packing A 306 is filled between the lower flange 302 and the circular guide tube 312, and the packing A 306 is pressed by the lower-flange packing gland 303 to ensure the seal between the lower flange and the circular guide tube. The distance-adjustment nut 313 is in contact with the lower-flange packing gland 303, a face-to-face distance between a sealing surface of the upper flange and a sealing surface of the lower flange is adjusted according to a face-to-face distance of valve seats of the valve, and the distance-adjustment nut is locked by the locking nut 310 to prevent loosening of the distance-adjustment nut 313.

The lower flange 302 is connected with the lower-flange packing gland 303 through the lower flange studs 309 and the lower flange nuts 311.

A sealing surface of the adjustable diversion hole structure 300 is tightly fitted against the guide plate 102.

The disc spring A 307 is in contact with a lower surface of the slot, and is pressed against the lower surface of the slot by the disc spring gasket 305 and the force-adjustment nut 308. A compression amount of the disc spring A is calculated according to the sealing force of the valve.

The sealing force of the adjustable diversion hole structure 300 according to the present application is adjustable under the premise that the face-to-face distance is constant. However, as for the conventional bellows diversion hole structure, the sealing force cannot be adjusted under the premise that the face-to-face distance is constant; besides, and after the valve is operated for a period of time, the face-to-face distance of the diversion hole structure is reduced due to wear of the sealing surfaces, such that it is difficult to ensure the sealing performance of the valve. According to the present application, the sealing force required for the seal of the valve is provided by adjusting the force-adjustment nuts 308, which ensures the sealing performance without changing the face-to-face distance of the diversion hole structure, so that the adjustment of the sealing force is more flexible and reliable.

Besides, as for the conventional bellows diversion hole structure, the face-to-face distance cannot be adjusted due to its structural limitation. With the wear of the sealing surfaces, the face-to-face distance of the diversion hole structure will be smaller and smaller, and finally leading to the failure of sealing. According to the present application, the face-to-face distance is adjusted by adjusting the distance-adjustment nuts 313. In a case that the face-to-face distance is too large or too small, it is only required to adjust the distance-adjustment nuts 313, so as to adjust the face-to-face distance to a suitable distance, which does not affect the supply of the sealing force and realizes the separate adjustment of the face-to-face distance and the sealing force, and the separate adjustment is more reliable and convenient.

From another aspect, as for the conventional bellows diversion hole structure, the face-to-face distance of the sealing surface is gradually reduced due to wear, flushing and other reasons, thereby causing the failure of sealing. Due to the structural limitation, the face-to-face distance is not adjustable, and the valve can only be scrapped. According to the present application, the reduced face-to-face distance can be adjusted by adjusting the distance-adjustment nuts 313 without affecting the performance, which prolongs the service life and reduces the maintenance cost. As for the conventional bellows diversion hole structure, during a machining process, it is difficult to weld a bellows to the upper and lower flanges due to a small thickness of the bellows, and processing accuracy cannot be guaranteed; and since the structure is formed by welding, rigidity of the bellows is affected by the welding, which will affect the magnitude of the sealing force, and the sealing force may be provided unevenly. According to the present application, the bellows is not employed, which eliminates an influence of the welding, instead, the sealing force and the face-to-face distance are adjusted separately; besides, the valve has an assembly structure and uniform arrangement, which ensures that the sealing force is uniformly provided, ensures the processing accuracy, and also makes the future maintenance more convenient.

5) An external disc spring assembly 240, a packing gland stud 118, a packing gland nut 119, a second packing gland 117, a first packing sleeve 114, packing B 202, packing C 113, a secondary-valve-stem packing gland 203, and a secondary-valve-stem packing-gland screw 207, as shown in FIG. 6.

The external disc spring assembly 240 is mounted on the valve stem 115, the packing C 113 is filled between the secondary valve stem 201 of the external disc spring assembly and the valve cover 200, and the packing C 113 is pressed by the second packing gland 117 and the first packing sleeve 114. The second packing gland 117 and the first packing sleeve 114 are connected with the valve cover 200 through the packing gland stud 118 and the packing gland nut 119. The external disc spring assembly 240 includes the secondary valve stem 201, the packing B 202 is filled between the secondary valve stem 201 and the valve stem 115, and the packing B 202 is pressed by the secondary-valve-stem packing gland 203, to ensure the seal. The secondary-valve-stem packing gland 203 is connected with the secondary valve stem 201 through the secondary-valve-stem packing-gland screw 207. The disc spring B 205 is sleeved on the valve stem 115 and pressed against the secondary-valve-stem packing gland 203 by the disc spring pressing plate 208.

The compression amount of the disc spring is calculated according to a maximum friction force during the operation of the valve.

As for the conventional parallel double-plate gate valve, the valve works at high temperature, and since the disc spring is located in the valve chamber, the disc spring also works at high temperature. With the external disc spring assembly 240 according to the present application, a jamming phenomenon during movement of the valve is avoided. The disc spring is located outside the valve chamber, which reduces an operating temperature of the disc spring, and the disc spring is operated at a normal temperature, which prolongs the service life of the disc spring. Besides, since the disc spring of the conventional parallel double-plate gate valve is located in the valve chamber, a working state of the disc spring cannot be determined, which affects safe operation of the valve. According to the present application, the disc spring is located outside the valve chamber, and the state of the disc spring can be observed at any time. In addition, since the disc spring of the conventional parallel double-plate gate valve is located in the valve chamber, the disc spring cannot be replaced online. According to the present application, the disc spring is located outside the valve chamber, so that the disc spring can be replaced online once the disc spring is found damaged, which simplifies the maintenance process and saves the maintenance time and cost.

The adjustable diversion hole structure 300 can adjust the face-to-face distance between the upper flange 301 and the lower flange 302, and can also adjust the compression amount of the disc spring, so as to adjust the sealing force, that is, both the face-to-face distance and the sealing force are adjustable without affecting each other. With the overall downward pushing wedge structure according to the present application, the two-way seal of the valve can be realized.

When the actuator drives the valve stem 115 to move downward, the valve stem 115 drives the external disc spring assembly 240, the valve stem column cap 112, the wedges 107, the goggle plate assembly 103, the valve plates 106 and the adjustable diversion hole structure 300 to move together. When the closed position is reached, the stud is in contact with the valve body, the goggle plate assembly 103, the adjustable diversion hole structure 300 and the support wedge 108 stop moving, while the valve stem 115 drives the wedges 107 to continue to move downward. Due to a wedge shape, each of the valve plates 106 is pressed by the corresponding wedge 107 to move toward a flow channel until the valve plate is tightly pressed against the valve seat to form a seal, and the valve stem 115 stops moving and stays in the position. Moreover, during continuous downward movement of the valve stem 115, the expansion connection sleeve assembly 400 mounted on the valve stem 115 continue to move downward along with the valve stem 115, to compress the disc spring B 205. The closing process of the valve is finished until the valve stem 115 stops moving and stays in the position.

Figure 14:
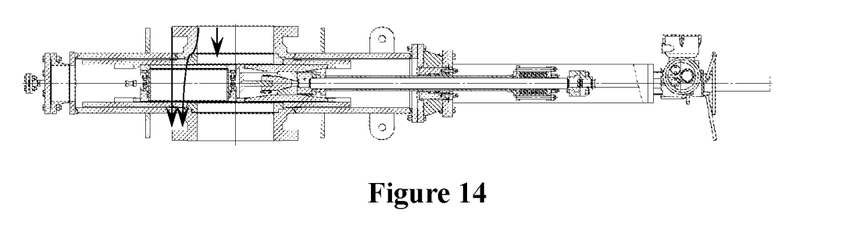
FIG. 14 is a schematic view showing the valve at a middle position.
Figure 15:
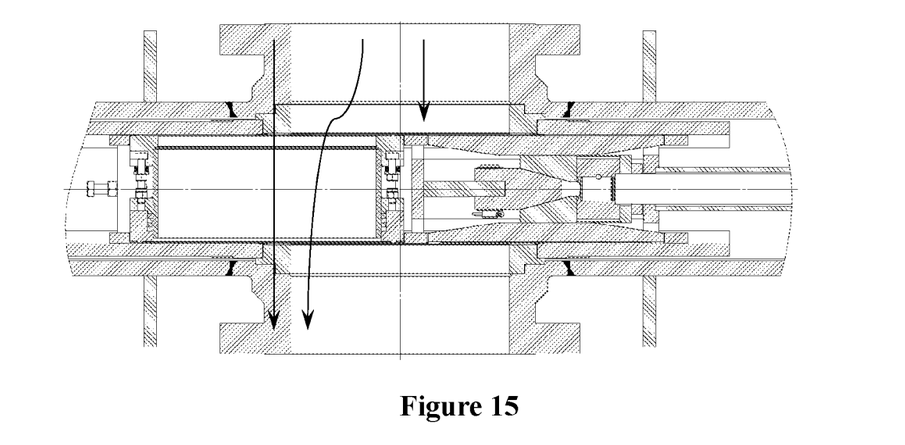
FIG. 15 is a schematic view showing the valve at the middle position (a partial view of FIG. 14)
Figure 16:
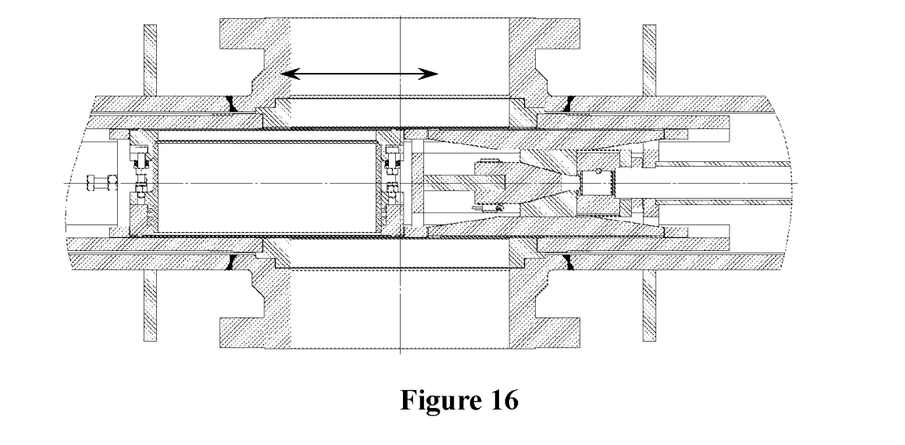
FIG. 16 is a schematic view showing action directions of the valve.

When the valve is being opened, the valve stem 115 drives the valve stem column cap 112 and the wedges 107 to move first, so that the valve plates 106 are detached from the valve seat and are no longer pressed. At the same time, the expansion connection sleeve assembly 400 also moves along with the valve stem 115, and the disc spring B 205 is gradually released. When an upper portion of the wedge 107 comes into contact with the goggle plate assembly 103, the valve stem 115 drives the valve plates 106, the goggle plate assembly 103, the adjustable diversion hole structure 300 and the external disc spring assembly 240 to move together. During the movement, the valve plate 106 and the adjustable diversion hole structure 300 are tightly fitted against the guide plate 102 to form a seal, thereby ensuring the sealing performance of the valve during operation.

Figure 11:
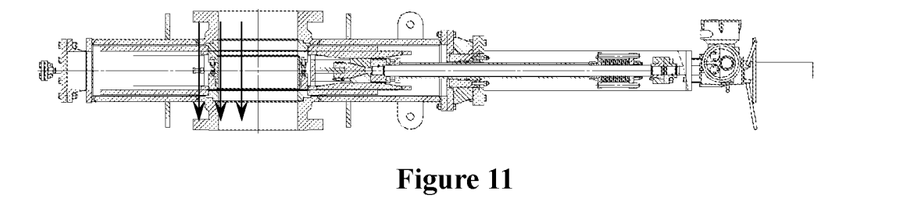
FIG. 11 is a schematic view showing the valve at an opened position.
Figure 12:
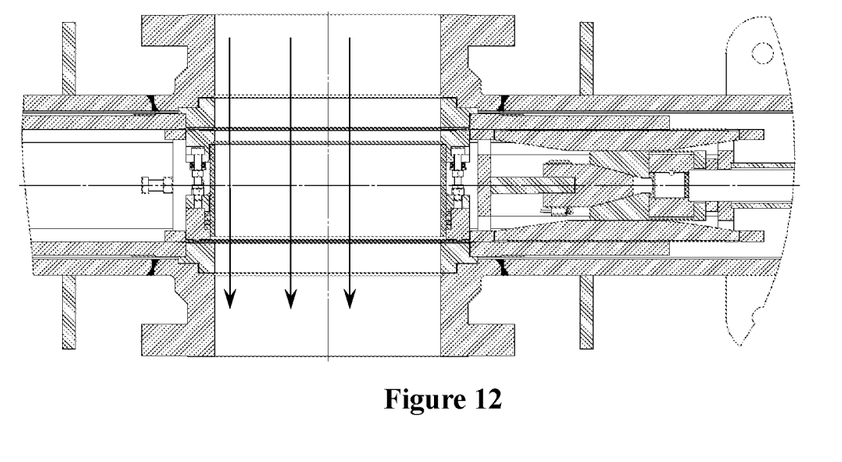
FIG. 12 is a schematic view showing the valve at the opened position (a partial view of FIG. 11)

When the valve is at the opened position, the adjustable diversion hole structure 300 is tightly fitted against the valve seat, to isolate the valve chamber from the flow channel, so as to form a full-diameter flow channel. Since the adjustable diversion hole structure 300 has elasticity, a seal may be formed between the diversion hole structure and the valve seat, that is, the elastic seal.

The present application can effectively solve the problems of the conventional parallel double-plate gate valve, such as poor sealing performance, easy damage of the disc spring, and adverse affection of the opposite side on the sealing at the closed position and the like. The present application is more suitable for the current ethylene production process.

Parts of the present application which are not described in detail belongs to the common knowledge of those skilled in the art.

The invention claimed is:

1. A double-plate gate valve, comprising a valve body, a valve cover, a valve stem, a guide plate, a goggle-like plate assembly, an adjustable pipe assembly, a disc spring assembly and a valve plate and wedge assembly, wherein
   the guide plate is nested in a valve chamber formed by the valve body and the valve cover;
   the goggle-like plate assembly is configured to provide mounting support for the adjustable pipe assembly and the valve plate and wedge assembly in the valve chamber, the goggle-like plate assembly is allowed to move along with the adjustable pipe assembly and the valve plate and wedge assembly in the valve chamber, and floating seals are formed at a contact surface between the adjustable pipe assembly and the guide plate, and at a contact surface between the valve plate and wedge assembly and the guide plate;
   the adjustable pipe assembly is adjustable, that is, a face-to-face distance and a sealing force between a sealing surface of the adjustable pipe assembly and a sealing surface of the valve body are adjustable, to allow a straight through pipe to be formed and an elastic seal between the adjustable pipe assembly and a valve seat to be formed in a case that the valve is fully opened;
   the disc spring assembly is configured to overcome friction forces of the valve plate and wedge assembly and the adjustable pipe assembly during a closing process of the valve; and
   the valve stem is configured to transmit actuating forces during opening and closing processes of the valves; and wherein
   the adjustable pipe assembly comprises an adjustable pipe structure, wherein the adjustable pipe structure comprises an upper flange, a lower flange and a circular guide tube, the upper flange is fixedly connected with the circular guide tube, and a plurality of slots are uniformly provided at a side edge of the upper flange;
   the adjustable pipe assembly further comprises an adjusting bolt, a disc spring A, a disc spring gasket, a force-adjustment nut, a locking nut and a distance-adjustment nut which correspond to each of the plurality of slots; wherein the adjusting bolt is mounted in the corresponding slot, and the disc spring A, the disc spring gasket, the force-adjustment nut, the locking nut and the distance-adjustment nut are sequentially mounted on the adjusting bolt; the disc spring A is in contact with a lower surface of the corresponding slot, and is pressed against the lower surface of the corresponding slot by the disc spring gasket and the force-adjustment nut; and
   the adjustable pipe assembly further comprises packing A and a lower-flange packing gland; the packing A is filled between the lower flange and the circular guide tube, and the packing A is pressed by the lower-flange packing gland, to ensure a seal between the lower flange and the circular guide tube; the distance-adjustment nut is in contact with the lower-flange packing gland; and the lower flange is fixedly connected with the lower-flange packing gland.

2. The double-plate gate valve according claim 1, wherein the slots are T-shaped.

3. The double-plate gate valve according to claim 1, wherein the sealing force is adjusted by adjusting a compression amount of the disc spring through the force-adjustment nut.

4. The double-plate gate valve according to claim 1, wherein the disc spring assembly is arranged outside the valve chamber.

5. The double-plate gate valve according to claim 4, wherein the disc spring assembly comprises a secondary valve stem, a disc spring, packing B filled between the secondary valve stem and the valve stem, a secondary-valve-stem packing gland, anti-rotation studs, a disc spring pressing plate, tooling nuts and an expansion connection sleeve assembly;
    the packing B is pressed by the secondary-valve-stem packing gland, the secondary-valve-stem packing gland is fixedly connected with one end of the secondary valve stem, and another end of the secondary valve stem is in contact with the goggle-like plate assembly; the disc spring is sleeved on the valve stem and pressed against the secondary-valve-stem packing gland by the disc spring pressing plate, a compression amount of the disc spring is adjusted by the expansion connection sleeve assembly, and the expansion connection sleeve assembly is fixed on the valve stem and is in contact with the disc spring pressing plate.

6. The double-plate gate valve according to claim 5, wherein the compression amount of the disc spring is determined according to a maximum friction force during operation of the valve.

7. The double-plate gate valve according to claim 1, wherein the valve plate and wedge assembly comprises two valve plates, a valve stem column cap, two wedges and a support wedge; the support wedge is fixed to the goggle-like plate assembly, and a central axis of the support wedge coincides with a central axis of the valve chamber; the valve stem column cap is mounted at one end of the valve stem for mounting the two wedges, a contact surface between each of the wedges and the valve stem is plane, and a contact surface between the wedge and the support wedge is oblique; and the two valve plates are mounted in the goggle-like plate assembly, and each of the two valve plates is allowed to move toward a flow channel according to a relative position of the corresponding wedge with respect to the support wedge.

8. The double-plate gate valve according to claim 7, wherein the support wedge is mounted at the goggle-like plate assembly through a pin washer, a pin and a split pin.

9. The double-plate gate valve according to claim 1, wherein a bracket assembly is mounted on the valve cover outside the valve chamber, and an actuator is mounted via the bracket assembly, to drive the valve stem to move.

10. The double-plate gate valve according to claim 1, wherein the valve body is welded to the valve seat, and the guide plate is arranged on the valve seat.

* * * * *